US006658713B1

(12) United States Patent
Wittum et al.

(10) Patent No.: US 6,658,713 B1
(45) Date of Patent: Dec. 9, 2003

(54) SEMI-AUTOMATIC ENGINE PISTON ASSEMBLY TOOL

(75) Inventors: John W. Wittum, Fenton, MI (US); Christopher W. Zwolensky, Grand Blanc, MI (US); Gary C. Spence, Swartz Creek, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/282,746

(22) Filed: Oct. 29, 2002

(51) Int. Cl.[7] .............................................. B23P 19/04
(52) U.S. Cl. ............................ 29/267; 29/709; 29/269; 29/888; 29/888.01; 29/888.044; 29/407.1; 29/714
(58) Field of Search .................... 29/709, 407.1, 29/269, 267, 268, 888, 888.01, 888.011, 888.04, 888.041, 888.044, 888.06, 407.09, 468, 559, 702, 712, 714, 829, 281.1, 281.5, 222, 224

(56) References Cited

U.S. PATENT DOCUMENTS

| | | | | |
|---|---|---|---|---|
| 3,952,393 A | * | 4/1976 | van Ravenzwaay et al. | .. 29/795 |
| 4,887,341 A | * | 12/1989 | Sakimori et al. | ......... 29/888.01 |
| 6,047,472 A | * | 4/2000 | Koch et al. | ............... 29/888.01 |
| 6,367,141 B1 | * | 4/2002 | Cook et al. | ................. 29/407.1 |
| 6,467,155 B1 | * | 10/2002 | Cook et al. | .................... 29/714 |
| 6,591,484 B2 | * | 7/2003 | Cook et al. | .................... 29/709 |

* cited by examiner

Primary Examiner—Joseph J. Hail, III
Assistant Examiner—Daniel Shanley
(74) Attorney, Agent, or Firm—Leslie C. Hodges

(57) ABSTRACT

An assembly tool for insertion of engine piston/rod assemblies into an engine cylinder includes a frame, a support arm pivotally carried on the frame, an insertion cylinder carried by the support arm and including an extendable insertion rod having an end adapted to engage a piston in position for insertion; a positioner for positioning the support arm in an insertion position with the rod end engaging a piston; and a control for actuating the insertion rod to insert a piston/rod assembly into the cylinder. Various additional features of an exemplary embodiment are also disclosed.

13 Claims, 4 Drawing Sheets

SEMI-AUTOMATIC ENGINE PISTON ASSEMBLY TOOL

TECHNICAL FIELD

This invention relates to assembly tools for installing piston and connecting rod assemblies in an engine.

BACKGROUND OF THE INVENTION

A common method of installing a piston/connecting rod assembly in an engine cylinder involves sliding a piston ring compressor sleeve (ring compressor) over the skirt and piston rings of the piston and manually inserting the connecting rod end of the assembly into the outer end of the engine cylinder. The piston/rod assembly is slid into the cylinder until the ring compressor engages the outer end of the engine cylinder. A guide finger may be utilized on the crank end of the connecting rod to guide the connecting rod in the cylinder and align the bearing recess with the crankpin of the engine crankshaft. The assembly is then forced into the engine cylinder so that the piston rings compressed by the ring compressor are guided into the cylinder and the piston is forced inward until the connecting rod bearing recess or bearing insert engages the engine crankpin. This "stuffing" step may be accomplished manually, such as by applying force against a stuffing block engaging the piston head. Automatic piston installing machinery has also been developed but it is very expensive to make as well as to maintain.

A form of manually-operated tool which is in common use in many engine assembly plants utilizes a manually-operated lever arm that is pivotable by the operator and has a roller that is moved into engagement with the piston head. The lever arm has a handle which is grasped by the operator and provides a mechanical advantage to assist the operator in pivoting the arm to force the piston through the ring compressor and into the cylinder until the connecting rod engages the associated crankpin. As the piston is forced into the cylinder, the ring compressor slides off and is caught by a hook on the lever arm as the arm is retracted by the operator. A biasing spring assists the retraction and holds the arm out of the way for insertion of the next piston/rod assembly.

Over a number of years, piston compression ring tension has been increasing in order to reduce the amount of piston ring blowby to better control exhaust emissions. The increased ring tension has tended to increase the force the operator must apply to overcome the ring tension acting against the cylinder as the piston is inserted into the cylinder bore. In order to reduce the effort required for this process, an assembly tool has been desired which could significantly reduce operator effort while being capable of construction at a reasonable cost and application to current and future assembly lines without requiring the significant outlays of capital required for a fully automatic machine.

SUMMARY OF THE INVENTION

The present invention provides a semi-automatic engine piston assembly tool which can be applied in place of the manual tool currently used in many assembly lines. The new tool utilizes a pivoting support arm which is controlled and moved into position by the operator grasping a handle in a manner similar to the prior manually actuated tool. However, the tool is provided with an air insertion cylinder, mounted on the end of the arm, that is moved into a position so that the piston head is engaged by the end of an insertion rod actuatable by the cylinder. A ring compressor retractor is carried on the end of the insertion rod.

The pivoting support arm is biased upwardly into a loading position by a balancing cylinder which utilizes low pressure air to retract the arm to the loading position. A piston/rod assembly is then loaded through the outer end of the engine cylinder with a ring compressor on the piston and engaging the engine cylinder outer end.

The operator manually moves the support arm into the insertion position with the end of the insertion rod against the piston head. The operator actuates and holds a trigger switch, which applies high pressure to lock the support arm in position and applies controlled air pressure to the insertion cylinder. This causes the insertion rod to advance through the ring compressor and force the piston/rod assembly into the engine cylinder until a bearing recess or bearing insert of the connecting rod engages the associated crankpin.

At this point, the ring compressor slides downward and is captured on the face of the ring retractor. A magnet on the retractor retains the steel ring compressor on the angled face of the retractor and allows the flange of the ring compressor to fall into a hook-like groove at the bottom of the retractor member. The operator then releases the trigger switch, which retracts the insertion rod into the insertion cylinder carrying the ring compressor with it. The support arm is then allowed to be raised by the balancing cylinder, carrying with it the ring compressor mounted to the face of the ring retractor at the end of the insertion rod. The tool is then moved on a carriage longitudinally along the side of the engine to the next cylinder position and a piston/rod assembly with the ring compressor attached is installed into the next cylinder for repetition of the assembly operation.

The semi-automatic assembly tool significantly reduces operator required effort since the force required for stuffing the piston into the cylinder is applied by the insertion air cylinder. At the same time, the improved operation with the automatic insertion and retraction steps is accomplished with a relatively simple but effective mechanism which can be applied to current assembly lines with a minimum of disturbance to the established features of the line. In addition, the tool is applicable to new assembly lines which can be fitted and installed at a relatively reasonable cost as compared to automatic machines which are both expensive and costly to maintain.

These and other features and advantages of the invention will be more fully understood from the following description of certain specific embodiments of the invention taken together with the accompanying drawings.

DESCRIPTION OF THE PREFERRED EMBODIMENT

Figure 1:
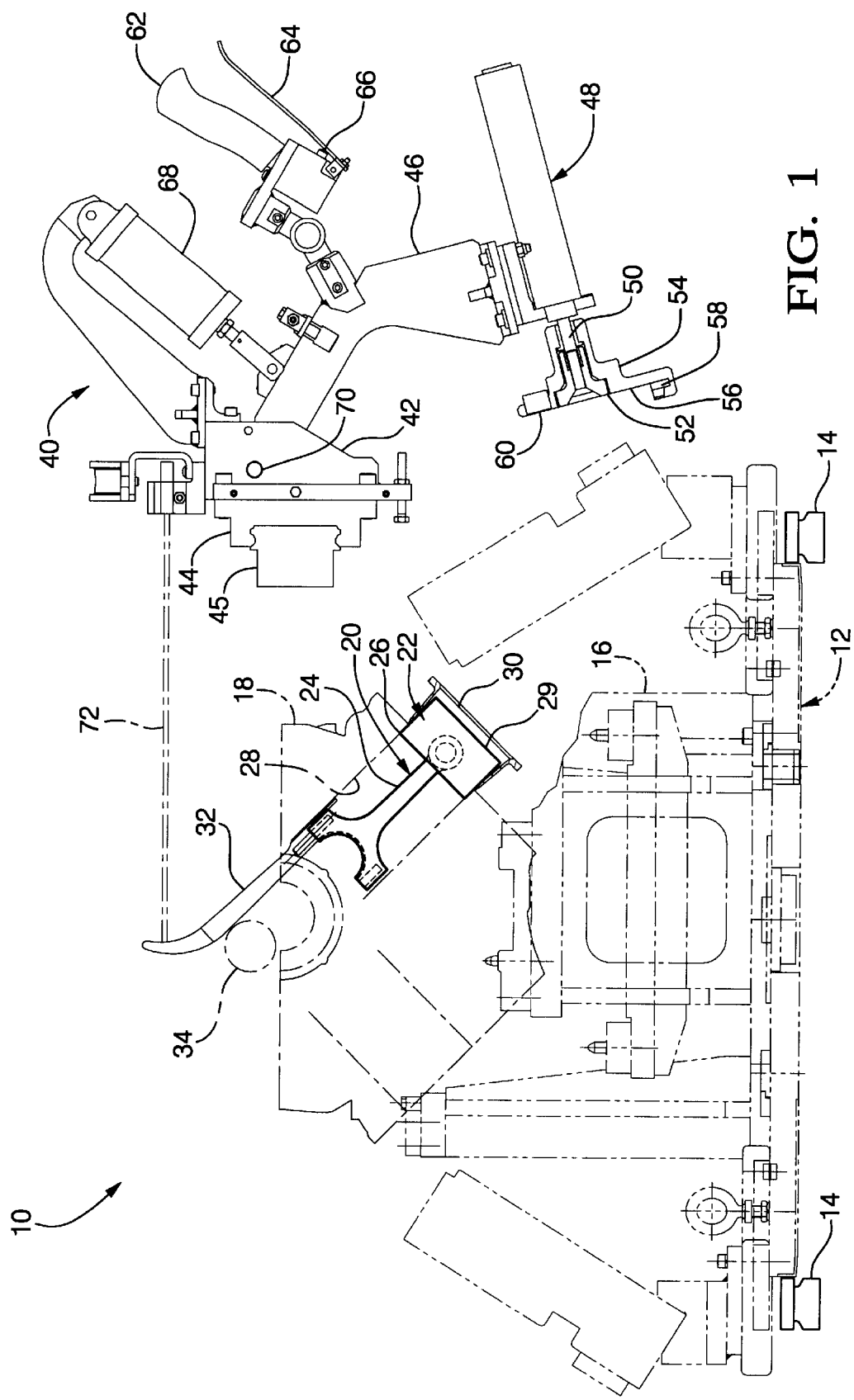
FIG. 1 is an end view of an assembly station for an engine including a mounting fixture shown in phantom carrying a V-type engine inverted for insertion of piston/connecting rod assemblies, with an assembly tool in accordance with the invention shown in the loading position.

Referring to the drawings in detail, numeral 10 generally indicates an engine assembly station that includes a fixture base 12 carried on conveyor rails 14 and supporting a mounting fixture 16 on which an engine block 18 is mounted inverted for assembly of a piston/rod assembly, generally indicated by numeral 20. Assembly 20 includes a piston 22 connected by a piston pin to a connecting rod 24. The piston has a skirt 26 which is partially inserted into an engine cylinder 28. The head portion 29 of the piston including the piston rings, not shown, is received in a ring compressor 30. The ring compressor is held in place on the piston by the friction of the piston rings, not shown, the friction of the skirt engaging the walls of the cylinder 28 and a guide finger 32 retaining the assembly 20 in position.

The guide finger 32 is mounted on the inner end of the connecting rod 24 and extends through the inner end of the engine cylinder 28 into engagement with a crankpin 34 of an associated engine crankshaft, not otherwise shown. The guide finger 32 supports the connecting rod in alignment with the crankpin and maintains the connecting rod out of contact with the cylinder bore so as to avoid scratching the bore during the assembly process.

The assembly station 10 is provided with an assembly tool 40 in accordance with the invention. Tool 40 includes a mounting frame 42 supported by a carriage 44 for longitudinal motion along a support rail 45. The frame 42 pivotably carries a support arm 46 having at its distal end an insertion cylinder 48. The cylinder 48 includes an insertion rod 50 having an end 52 which carries a ring retractor 54. The insertion cylinder 48 is connected with a source of air pressure, not shown, which actuates a piston internally to extend the insertion rod 50. The ring retractor 54 includes a support face 56 having a hook-like arcuate recess 58 along its lower end and a magnet 60 along its upper edge.

A manual handle 62 is mounted intermediate the ends of the support arm 46 and includes a trigger 64 engaging a trigger switch 66 which can be actuated by the operator to operate the insertion cylinder 48. The support arm 46 is biased into the loading position shown in FIG. 1 by a balancing and locking air cylinder 68 which is supported at one end by an extension of the frame 42 and connects at the other end with the support arm 46 between the handle 62 and a pivot pin 70 on which the arm 46 is pivoted.

In operation, the engine assembly station may be temporarily stationary or continuously moving depending upon the particular operation mode of the assembly line in which the station is located. The operator first provides or obtains a piston rod assembly 20 having a ring compressor 30 slid over the piston rings and inserts this assembly into the cylinder 28 until the piston skirt engages the cylinder 28 and the finger 32 rides on the surface of the crankpin 34. The assembled components are retained in place by friction of the piston skirt in the cylinder and the finger on the crankpin, also the friction of the piston rings against the ring compressor which is positioned in engagement with the outer end of the cylinder 28.

Figure 2:
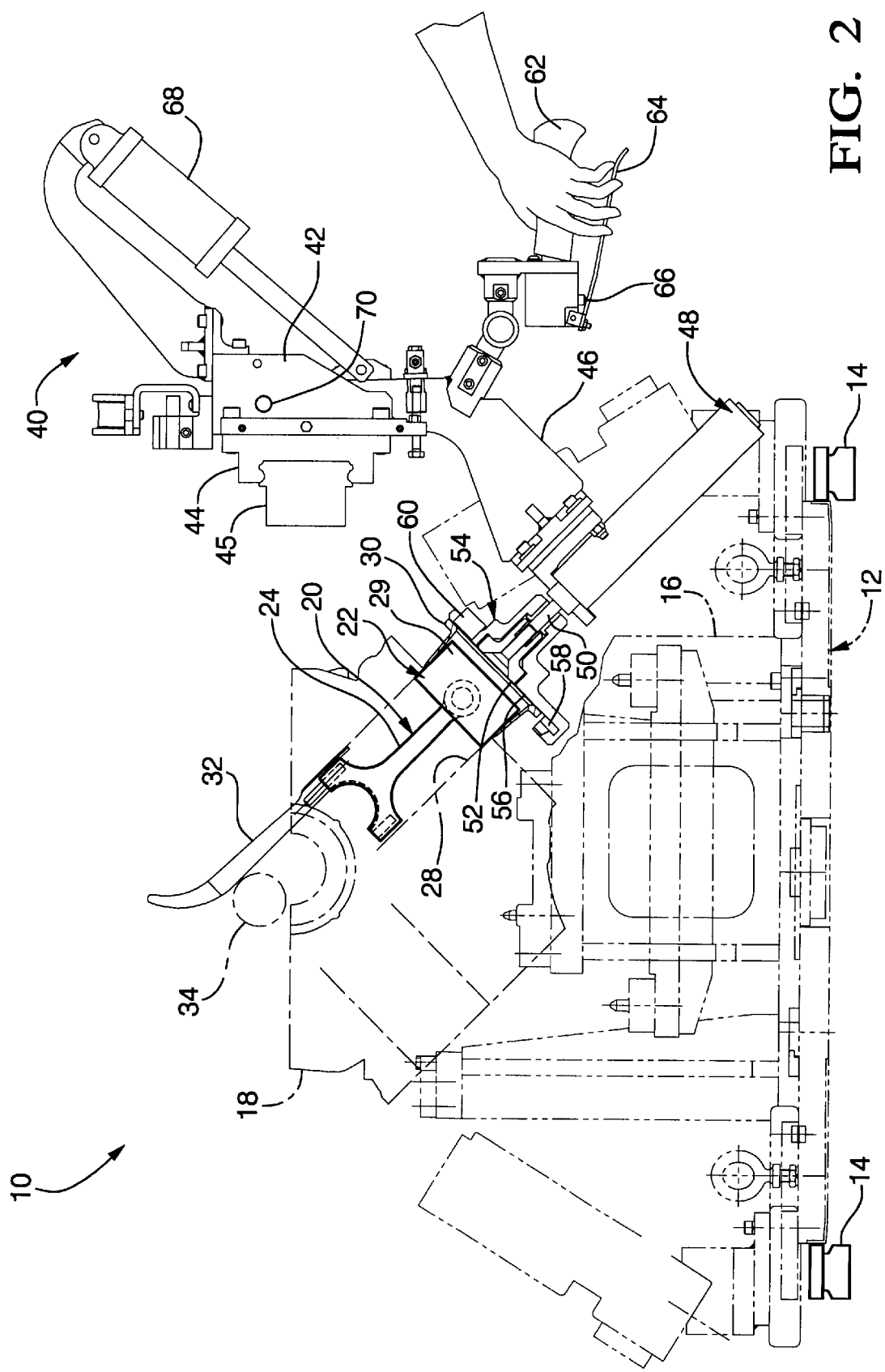
FIG. 2 is a view similar to FIG. 1 with the assembly tool shown in the insertion position.

The operator then uses the handle 62 to manually pivot the support arm 46 down against the bias of the balancing cylinder 68 and forward toward the insertion position shown in FIG. 2. There the ring retractor 54 engages a lip on the ring compressor 30 and the end 52 of the insertion rod 50 engages or closely approaches the head 29 of the piston 22.

Figure 3:
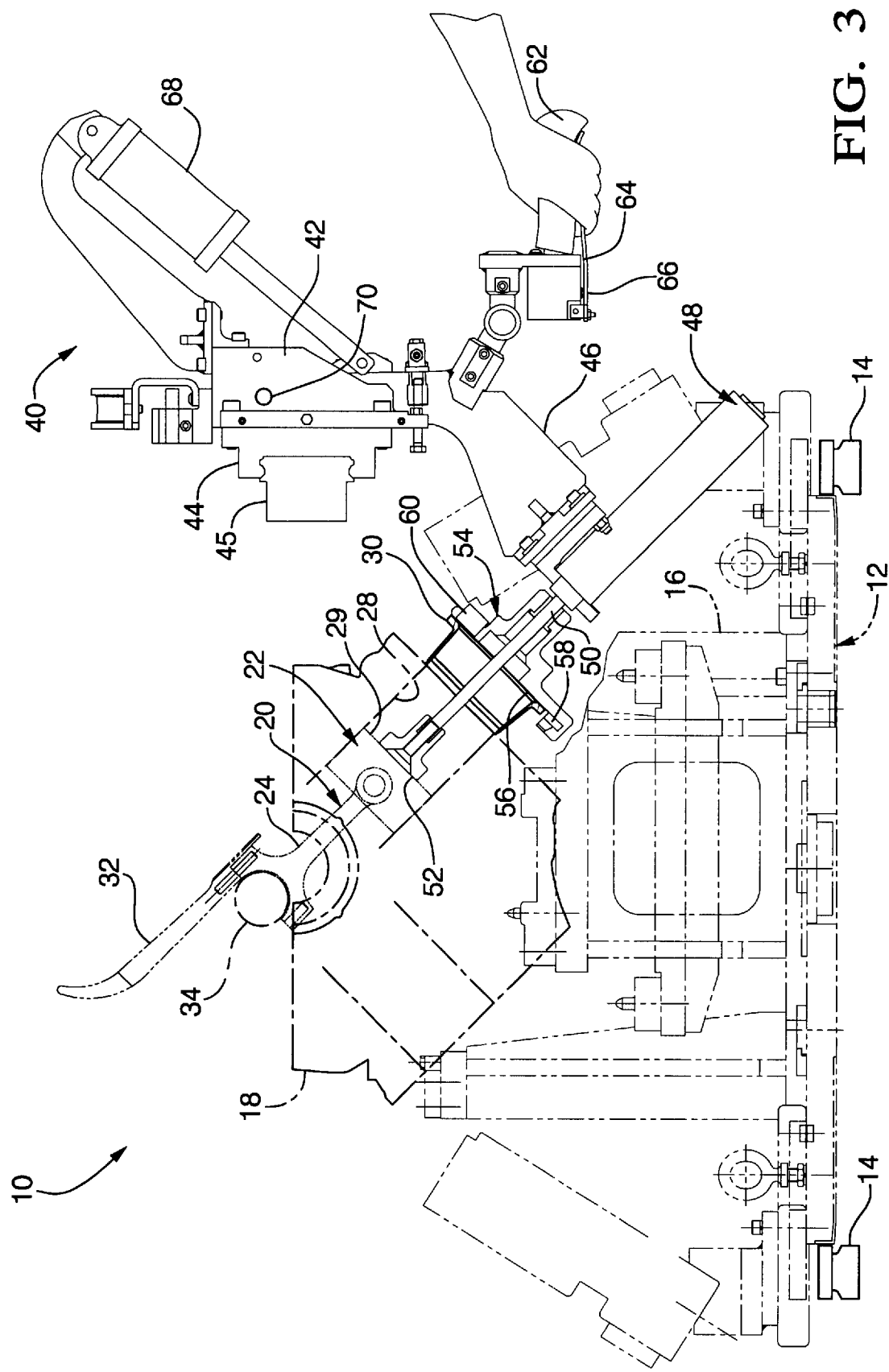
FIG. 3 is a similar view with the assembly tool shown in the actuated position and the piston/rod assembly fully installed.

When the support arm and associated insertion cylinder 48 reach the insertion position, the operator pulls the trigger 64 actuating the trigger switch 66. This causes high pressure air to be applied to the other side of the balancing cylinder 68 to lock the insertion cylinder in position with the ring retractor 54 against the ring compressor 30. At the same time, controlled air pressure is fed to the insertion cylinder 48. The air pressure urges the insertion rod end 52 against the piston and forces the piston/rod assembly fully into the bore 20 until the connecting rod recess with an associated bearing insert, not numbered, engages the crankpin 34 as shown in FIG. 3.

When the assembly tool reaches the fully inserted position, the operator releases the trigger switch 66, which cuts off the air pressure and actuates the insertion cylinder 48 to retract the insertion rod 50, leaving the piston/rod assembly in place and withdrawing the rod into the cylinder. At this point or before, the ring compressor 30 falls away from the engine cylinder block against the support face 56 of the ring retractor 54. The magnet 60 holds the steel ring compressor against the face 56 and allows it to slide downward so that the rim is received into the arcuate recess 58 and the magnet 50 holds the ring compressor rim against the support face 56.

Figure 4:
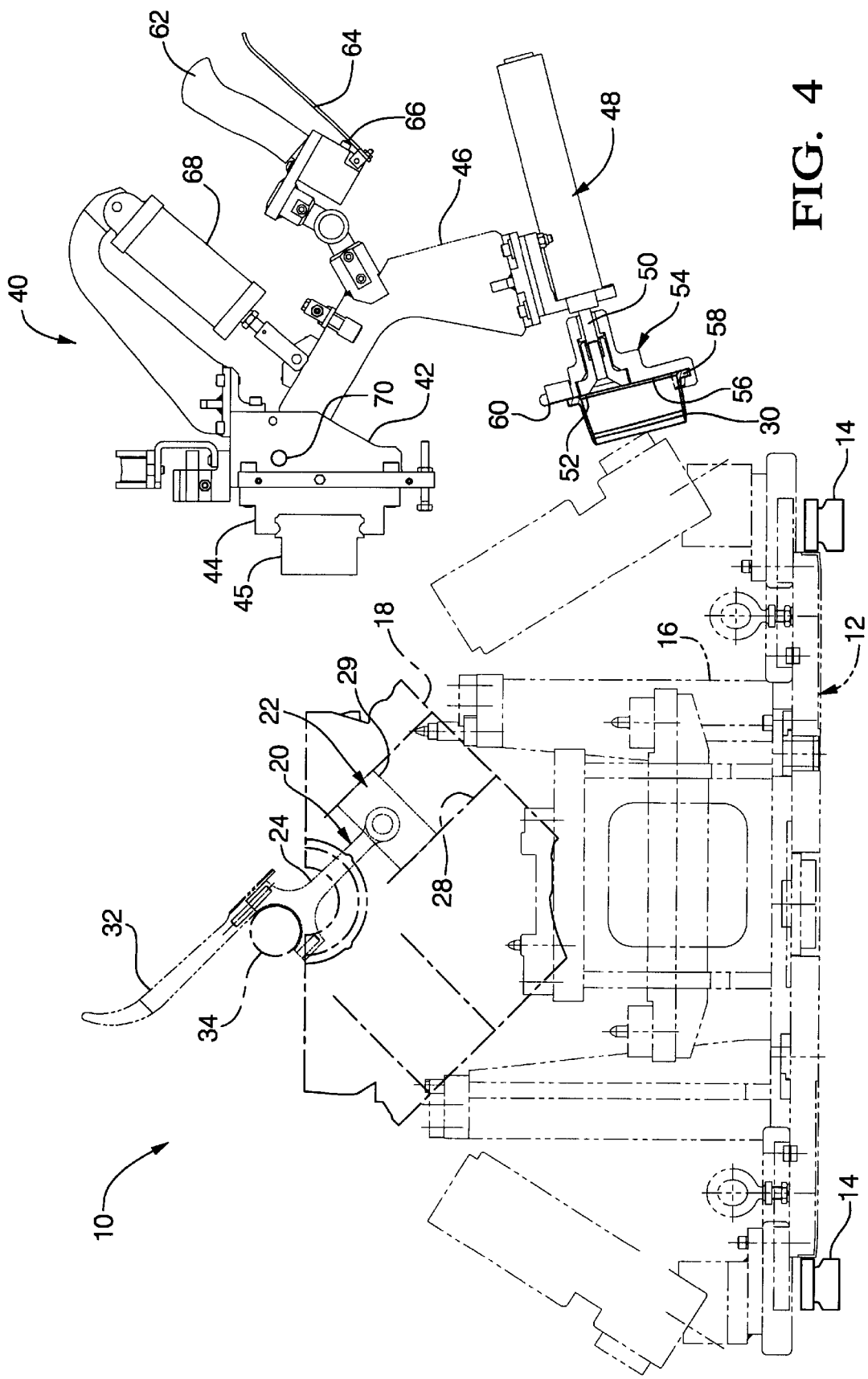
FIG. 4 is a similar view showing the tool retracted to the initial loading position and carrying the ring compressor ready for removal and installation on the next piston/connecting rod for assembly.

As the insertion rod 50 is retracted, the lock pressure on the balancing cylinder 58 is also released and the biasing pressure is again applied so that the operator is easily able to control return of the support arm to the loading position shown in FIG. 1. During the return motion, the ring compressor 30 is carried by the ring retractor 54 and is retained in place by the magnet 60, as shown in FIG. 4. Thus, the ring compressor is immediately available by the operator to be removed from the ring retractor and placed together with another piston/rod assembly for manual insertion into another engine cylinder. Alternatively, of course, piston/rod assemblies with ring compressors installed could be provided in advance for installation on the engine and the ring compressors could be placed aside as they are removed for assembly by a third person into assemblies for installation in the next engine.

Upon manual insertion of the next piston/rod and ring compressor assembly into an adjacent cylinder, the assembly tool 40 is again aligned by the operator with the adjacent cylinder and the assembly process is again repeated. If desired, guide means could be utilized to align or assist the operator in aligning the assembly tool frame along its supporting guide rail into the proper position of alignment with the cylinder in which the piston/rod assembly is to be installed. Any form of alignment means may be utilized, such as, for example, an aiming device or an indicator, such as a laser beam 72 (FIG. 1) projected on the associated guide finger, in order to provide a proper alignment reference.

The assembly tool of the invention is easily substituted for the manual assembly tool previously utilized in many engine assembly lines in current use. The tool is relatively economical to manufacture and easy to utilize by the operator while relieving the operator from the effort needed for manual "stuffing" of the piston/rod assemblies.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An assembly tool for insertion of engine piston/rod assemblies into an engine cylinder block, said tool comprising:

a frame;

a support arm pivotally carried on the frame;

an insertion cylinder carried by the support arm and including an extendable insertion rod having an end adapted to engage a piston in position for insertion;

a positioner for positioning the support arm in an insertion position with the rod end engaging a piston; and a control for actuating the insertion rod to insert a piston/rod assembly into the cylinder block.

2. An assembly tool as in claim 1 including lock means operable to restrain the support arm during insertion of the piston by the insertion rod.

3. An assembly tool as in claim 1 including balancing means for limiting the force required for manually positioning the arm in at least one direction of motion.

4. An assembly tool as in claim 3 wherein the balancing means biases the support arm toward a retracted position from which it is manually movable into the insertion position.

5. An assembly tool as in claim 1 wherein the positioner includes a handle for manually positioning the support arm.

6. An assembly tool as in claim 1 including a retraction cylinder operable to retract the support arm to an initial loading position after insertion of a piston/rod assembly.

7. An assembly tool as in claim 6 wherein the retraction cylinder also acts as the balancing means and is connected to hold the support arm in the insertion position to act as the lock means during piston insertion.

8. An assembly tool as in claim 1 including a carriage supporting the frame for longitudinal motion parallel to a longitudinal axis of the engine.

9. An assembly tool as in claim 1 wherein the control is a manually actuated switch operable to actuate the insertion motion of the insertion rod.

10. An assembly tool as in claim 1 wherein the insertion cylinder is released to retract the insertion rod upon completion of the insertion motion.

11. An assembly tool as in claim 1 including a ring compressor retractor operative to catch a piston ring compressor upon its separation from a piston during insertion of a piston/rod assembly and to retract the ring compressor upon movement of the support arm to an initial loading position.

12. An assembly tool as in claim 1 wherein the ring compressor retractor is mounted on the insertion rod and is biased toward the end of the insertion rod and against an end of the engine cylinder during insertion of a piston/rod assembly.

13. An assembly tool as in claim 1 including an interlock that prevents actuation of the insertion rod when the assembly tool is not in an insertion position.

* * * * *